April 20, 1926.  1,582,000
J. GESELL
INSTRUMENT FOR THE USE OF DENTAL FLOSS
Filed August 7, 1925
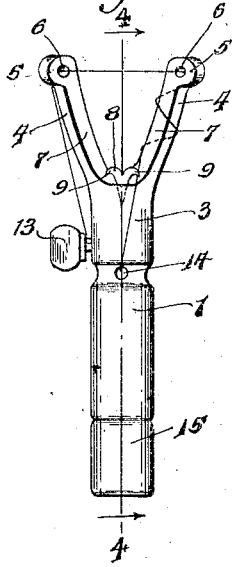
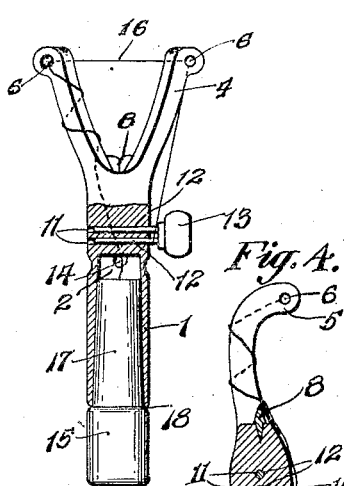
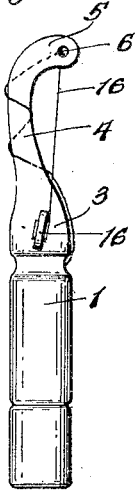
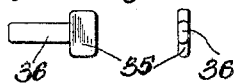
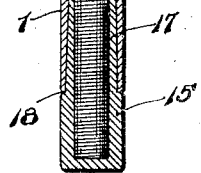
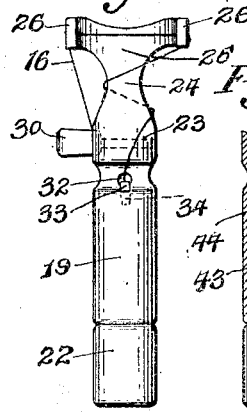
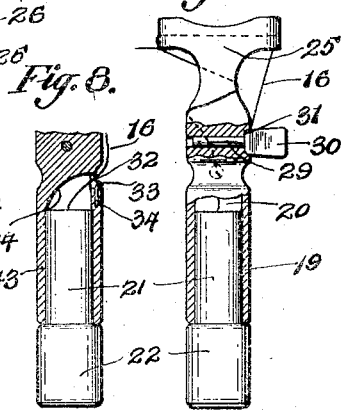
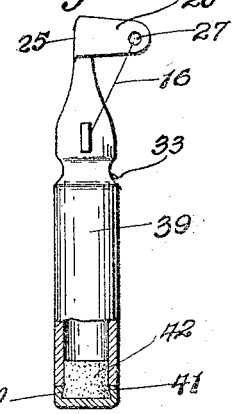
INVENTOR.
Joseph Gesell,
BY
Geo. P. Kimmel, ATTORNEY.

Patented Apr. 20, 1926.

1,582,000

UNITED STATES PATENT OFFICE.

JOSEPH GESELL, OF WASHINGTON, DISTRICT OF COLUMBIA.

INSTRUMENT FOR THE USE OF DENTAL FLOSS.

Application filed August 7, 1925. Serial No. 48,821.

*To all whom it may concern:*

Be it known that I, JOSEPH GESELL, a citizen of the Republic of Germany, residing at Washington, in the District of Columbia, have invented certain new and useful Improvements in Instruments for the Use of Dental Floss, of which the following is a specification.

This invention relates to dental floss holding instruments designed to be used by dentists for cleaning the teeth of patients, or by the patients themselves.

The primary object of this invention is the provision, in a manner as hereinafter set forth, of an instrument for holding a strip of dental floss taut in such a manner as to enable a user to force the floss between the teeth to thoroughly clean therebetween.

Another object of the invention is the provision, in a manner as hereinafter set forth, of an instrument for holding dental floss in the manner above described and having means whereby the floss may be so secured as to prevent the same from sagging or giving away while in use.

Still another object of the invention is the provision, in a manner as hereinafter set forth, of a dental floss holding instrument having a receptacle in the handle thereof and means for drawing the floss from a spool contained in said receptacle, over holding arms to a point where the free end is secured in such a manner as to prevent the floss from becoming loosened while in use.

A still further object of the invention, is the provision, in a manner as hereinafter set forth, of a dental floss holding instrument of the type above described, having a head so formed that the user may force the floss between the teeth by closing the teeth upon the head, forcing the floss the proper distance between the teeth without cutting the gum.

The final object of the invention is the provision, in a manner as hereinafter set forth, of an instrument for holding dental floss, constructed in such a manner as to be free of unnecessary cavities which might become unsanitary, of unique and attractive appearance, strong and durable in construction, inexpensive to manufacture and easily and quickly assembled and put in condition for use.

The invention will be best understood from a consideration of the following detailed description taken in connection with the accompanying drawing forming a part of this specification, with the understanding that the invention is not confined to any strict conformity with the showing of the drawing but may be changed and modified so long as such changes and modifications mark no material departure from the salient features of the invention as expressed in the appended claims.

In the drawing:—

Figure 1 is a view one form of construction of the device embodying this invention.

Figure 2 is a rear elevation of the same having the lower part thereof in longitudinal section.

Figure 3 is a side elevation of the instrument shown in Figures 1 and 2.

Figure 4 is a side view partly in elevation and partly in longitudinal section of the instrument shown in Figures 1, 2 and 3.

Figure 5 is a front elevation of a modified structure of the instrument.

Figure 6 shows the construction of Figure 5 in rear elevation and having a portion thereof in section.

Figure 7 is a side elevation of an instrument similar to that shown in Figures 5 and 6 with the exception that the body and head are formed in one casting with a closure cap or plug for the lower end thereof.

Figure 8 shows in longitudinal section the lower portion of an instrument which has been cast over a core, showing a particular construction of the interior thereof.

Figures 9, 10 and 11 show certain modifications of keys used in connection with this instrument.

Referring now to the drawing in detail wherein like numerals of reference indicate corresponding parts throughout the several views, the description will first be confined to the showing of Figures 1, 2, 3 and 4, the instruments shown in these figures being intended primarily for use by dentists or other persons who might use the instrument for the cleaning of teeth of patients.

The instrument comprises an elongated body 1 having the interior thereof axially recessed as at 2 and the lower end opened as shown in Figure 2.

The upper portion of the body merges into a solid head 3, the upper portion of which head carries a pair of diverging slightly curved arms 4 which set up a substantially V-shaped structure thereon. The upper ends of these arms have slight forward extensions 5 and are also provided with the transverse apertures 6. As clearly shown in Figure 1 the arms 4 have a slight torsional twist which causes the upper ends 5 to be set at an angle with respect to each other, and causing the faces 7 of the arms to also be at an angle with respect to each other and facing toward one side of the instrument.

In the crotch formed between the lower portion of the arms 4, there is lodged a cutter element 8, the upper portion of which is formed to provide a pair of curved cutter arms 9 the upper and lower edges of which arms are sharpened for cutting the floss carried by the instrument, as shown in Figure 4.

The solid head 3 is provided with a pair of transverse apertures 11 into which the legs 12 of a key 13 normally extend. An aperture 14 is formed through the side of the body 1 to open into the interior 2 thereof, and there is provided for insertion into the interior 2 of the body the combined receptacle closure element 15, in which there is adapted to be placed a spool carrying thereon floss 16. This combined closure receptacle element 15 has a reduced portion 17 of substantial length which enters and extends nearly the entire length of the interior of the body 1. The lower portion of this member is enlarged as at 18 to abut the lower end of the body to limit the inward movement of the same into the body. In order to make the receptacle closure element 15 fit tightly in the body 1 the interior wall of the chamber 2 and the outer wall of the reduced portion 17 may be slightly tapered so that a binding effect will be obtained when the two parts are put together. This will insure a tight fit between the member 15 and the body without the use of screw thread connections, which construction would be unsanitary and objectionable.

As is clearly shown in the side elevations 3 and 4 the arms 4 are curved at the upper ends thereof causing the head portion 5 to be directed forwardly in the direction toward which the faces 7 of the arms are turned.

In Figures 5 and 6 there is shown a slight modification of the instrument described in connection with the foregoing figures, the modification having to do principally with the head of the instrument. In these figures the body portion 19 may be the same as the body portion 1 of the other figure, having an axial chamber 20 formed therein to receive the reduced portion 21 of the combined receptacle cap member 22. The upper portion of this body 19 carries thereon a head 23 constricted at its upper portion to provide the neck 24, which neck merges into one edge of a flat transversely extending portion 25 from the sides of which portion 25 the forwardly projecting arms 26 extend. The back of the portion 25 is flat as shown, and the purpose for this particular construction will be brought out as the description proceeds.

The ends of the arms 26 are provided with the apertures 27 and the head 23 is also provided with an aperture 28 in which the leg 29 of the key member 30 extends. The side of the head is slightly recessed as at 31 to allow the inner end of the head of the key 30 to extend thereinto to become locked against undesired movement. The body is provided with the aperture 32 which opens from the outer side thereof into the chamber 20 from which the thread or floss 16 passes.

In connection with this construction, there is shown a hook shaped cutter element 33, which cutter has an elongated portion 34 which is fixed in the body 19 through the wall of the passage 32 in such a manner as to leave the hooked portion of the cutter extending outwardly and downwardly from the opening through which the floss is to be passed. The inner curved side of this cutter 33 is sharpened so that the floss 16 can be drawn upwardly thereagainst to be severed.

In preparing the instrument shown in Figures 1, 2, 3 and 4 for use, the floss 16 is passed through the opening 14 to the exterior of the head and is given one or two wraps about one of the arms 4, passed through the apertures 6 in the ends of the arms as shown in Figures 1 and 2 and the free end is then brought down to the key 13. The legs of the key 13 are positioned one on each side of the floss 16 and the key given several turns to draw the floss tight between the ends of the arms 4 whereupon the legs are inserted into the passages 11 where the key is held against the rotation thus preventing that portion of the floss lying between the ends of the arms 4 from becoming loosened while being used. As is well known the dental floss is usually waxed and the wrapping of the same about one of the arms after bringing the floss from the interior of the instrument, causes a binding of the floss about the arms thus preventing the same from slipping.

In the use of the instrument shown in Figures 5, 6 and 7, the floss after being drawn through the aperture 32 is given one or two wraps about the neck 24 of the instrument and is then passed through the aperture 27 across the ends of the arms and downwardly to the key 30 where the free end is wrapped about the leg 29 of the key and the key forced into the aperture 28 until the inner end engages in the slot 31 formed in the head. The floss is thus tightly held and the key cannot turn to allow the floss to become loosened.

In Figures 9, 10 and 11 there are shown several modifications of keys, the key shown in Figure 9 having the flat head 35 and an elongated relatively flat leg 36. It will be readily seen that when this leg is inserted into a slot of the same shape that the key cannot turn therein. The same key is shown in end elevation in Figure 10. The key shown in Figure 11 is provided with a flat head 37 and the leg thereof is triangular in shape as indicated at 38 which leg is designed to be passed into a slot of the same triangular conformation.

While one type of key has been shown in connection with the instrument disclosed in Figures 1 to 4 and another type shown in the Figures 5 to 7, it is to be understood that these types of keys are not restricted to use with these particular types of instruments but any type of key here shown and described may be used with any of the instruments, as desired.

The body portion 39 of the instrument shown in Figure 7 is of slightly different construction from that shown in Figures 5 and 6 as in this construction the body is of one piece and the open lower end is closed by a cap 40 having the inner wall inclined as indicated at 41 and there is forced into this cap one end of a cork 42 which is designed to be inserted into the open end of the body to close the same.

A further body construction is shown in Figure 8. In this construction the body 43 is axially recessed but the upper end thereof has a portion of the wall curved as at 44 causing the inner end to taper toward the opening 32 of the body. These bodies may be cast over a core and in this event the core would be correspondingly shaped at the inner end and could be easily removed from the body, and further this conformation of the inner end of the chamber formed in the body makes the threading of the floss 16 through the apertures 32 a comparatively simple process for by inserting the floss into the recess the inner end of the floss will be naturally guided toward the opening 32 and will pass therethrough. This interior formation may be used in the other instruments shown if so desired.

From the foregoing description it will be readily seen that there has been provided an unique and novel dental floss holding instrument which owing to its simplicity and lack of screws and other connections requiring uneven surfaces, will be extremely easy and simple to keep clean and sanitary. The instrument may be constructed of any desired material such as bone, ivory, metal, wood or porcelain. The latter substance is preferred for it can be easily prepared and given a high polish which will give it a clean and sanitary appearance and besides porcelain may be easily sterilized without becoming damaged.

Having thus described my invention what I claim is:

1. A dental floss holding instrument of the character set forth, comprising a hollow handle body designed to receive a spool of dental floss, said body having an aperture therethrough for leading one end of said floss to the exterior thereof, a relatively flat body extending transversely of one end of said handle in edge opposed relation thereto, an arm member extending at right angles to the surface of and from each side of said portion, means for securing a strip of said floss across between said arms, and non-revoluble removable means for securing and holding the free end of said floss.

2. A dental floss holding instrument of the character set forth comprising, a hollow handle body designed to receive a spool of floss, said handle having an aperture therethrough for leading said floss to the exterior thereof, means to provide a pair of spaced arms between the ends of which said floss is adapted to be held, and means carried by the instrument beneath said arms for holding the free end of said floss to maintain the same taut between said arms, said handle body having the inner end of the interior thereof constricted and directed toward the aperture through the wall to expedite the threading of the floss threthrough.

3. A dental floss holding instrument of the character set forth comprising, a handle body having an axially extending chamber formed therein from one end, and further having an aperture formed through the wall thereof for the passage of said floss to the exterior of the body, a cap for the open end of said body having a reduced extension of slightly less length than said chamber and adapted to extend thereinto and further having a chamber formed therein for the reception of a spool of floss, means to provide a pair of arms upon said body, provided with means for holding said floss stretched between the ends thereof, and means for holding the free end of said floss securely to maintain the same taut between said arms, said handle body having the inner end of the interior thereof constricted and directed toward the aperture through the wall to expedite the threading of the floss therethrough.

4. A dental floss holding instrument of the character set forth, comprising a handle body having an axially extending chamber formed therein from one end and further having an aperture formed through the wall thereof for the passage of said floss, a cap for the open side of said body, a plug carried by said cap and adapted to frictionally engage in the open end of the body, means to provide a pair of arms upon the other end of the body to support a length of floss in position for use, and a non-revoluble removable key extended into the side of the body to hold the free end of said floss.

In testimony whereof, I affix my signature hereto.

JOSEPH GESELL.